United States Patent [19]

Kodachi et al.

[11] Patent Number: 5,216,813
[45] Date of Patent: Jun. 8, 1993

[54] CLAMPING TOOL

[75] Inventors: Osamu Kodachi; Masanori Ozaki, both of Tokyo; Masato Morita; Yositika Nagayama, both of Yokohama, all of Japan

[73] Assignee: The Furukawa Electric Co., Ltd., Tokyo, Japan

[21] Appl. No.: 839,350

[22] Filed: Feb. 20, 1992

[30] Foreign Application Priority Data

Feb. 26, 1991 [JP] Japan .................................. 3-053155

[51] Int. Cl.⁵ ........................ B26B 15/00; C04B 35/52
[52] U.S. Cl. ............................................ 30/228; 501/88
[58] Field of Search .................. 30/228; 81/487, 900; 501/88, 95; 242/149; 292/305, 256

[56] References Cited

U.S. PATENT DOCUMENTS

| | | | |
|---|---|---|---|
| 4,992,318 | 2/1991 | Gadkaree | 501/88 |
| 5,017,528 | 5/1991 | Tiegs et al. | 501/88 |
| 5,032,550 | 7/1991 | Derkacy | 501/88 |
| 5,053,364 | 10/1991 | Ray | 501/88 |
| 5,062,185 | 11/1991 | Dwivedi | 501/88 |

*Primary Examiner*—Douglas D. Watts
*Assistant Examiner*—Heyrana, Sr. Paul M.
*Attorney, Agent, or Firm*—Frishauf, Holtz, Goodman & Woodward

[57] ABSTRACT

A clamping tool having a clamping head, a cylinder member coupled to an edge portion of the clamping head, a ram member coupled to and movably arranged within the cylinder member, a first die member coupled to the clamping head, and a second die member arranged to face the first die member and movable by the ram member toward and away from the first die member, wherein at least the clamping head is formed of a composite material prepared by dispersing at least one reinforcing material selected from the group consisting of ceramic fibers, ceramic whiskers and ceramic particles into a matrix metal consisting essentially of an aluminum alloy or a magnesium alloy. The clamping head is light, has a high Young's modulus, exhibits a high fatigue resistance, and is free from cracking and scattering of the cracked pieces. The clamping tool permits an operator to operate the clamping tool under a safe environment, and lessens the burden given to the operator, leading to an improved working efficiency.

9 Claims, 3 Drawing Sheets

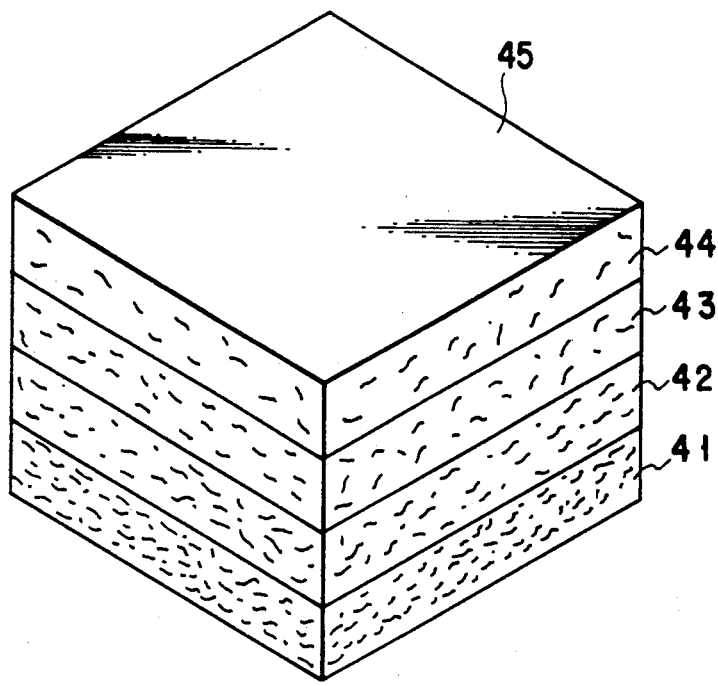
F I G. 5
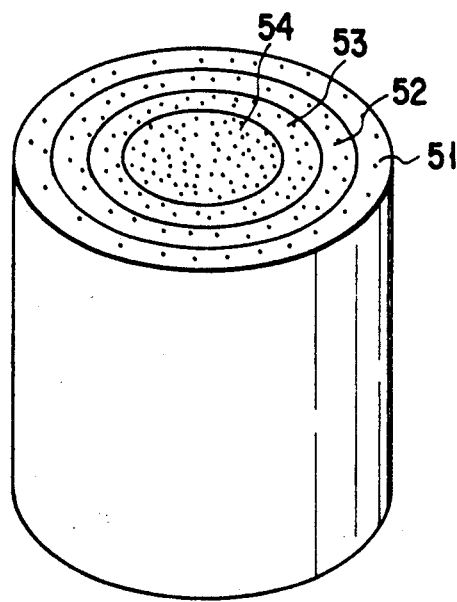
F I G. 6

CLAMPING TOOL

BACKGROUND OF THE INVENTION

1. Field of the Invention

The present invention relates to a clamping tool used in the cutting of, for example, an electric wire, and particularly, to an improvement in the material of the clamping head of a clamping tool.

2. Description of the Related Art

FIG. 1 shows the construction of a conventional clamping tool 1. As shown in the drawing, the clamping tool 1 comprises a clamping head 2. A substantially elliptical hollow portion 3 is formed by cutting away a front portion of the clamping head 2. A cylinder member, which is mounted to the lower portion of the clamping head 2, comprises a cylinder body 4 fit with the lower portion of the clamping head 2 and a piston rod 5 which makes a reciprocating motion within the cylinder body 4. The piston rod 5 is driven by, for example, a hydraulic system, not shown. A ram member consisting of a ram head 6 and a ram body 7 joined to the ram head 6 in the vertical direction by, for example, a screw is inserted into the cylinder body 4. The ram body 7 is formed of a cylinder having a bottom to which the piston rod 5 is joined. A spring 8 is wound about the piston rod 5 housed within the ram body 7. When the pushing force of the piston rod 5 is released, the spring 8 permits the ram body 7 to be brought back to the original position. A first die member $9_1$ is mounted within the hollow portion 3 of the clamping head 2. On the other hand, a second die member $9_2$ is mounted to the upper surface of the ram head 5 in a manner to face the first die member $9_1$.

The clamping tool of the construction described above is used for cutting, for example, an electric wire stretched between utility poles. In cutting the electric wire, the electric wire is held between the first and second die members $9_1$ and $9_2$ positioned within the hollow portion 3 of the clamping head 2. Under this condition, the piston rod 5 of the cylinder member is moved upward. Also, the ram head 6 and the ram body 7, which are joined to the piston rod 5, are moved in the same direction. As a result, the second die member $9_2$ mounted to the ram head 6 is moved toward the first die member $9_1$ so as to compress and cut away the electric wire held between the first and second die members $9_1$ and $9_2$.

To be more specific, the clamping tool 1 is mounted to the tip of a long hollow rod 11, as shown in FIG. 2. One end of a hose 12, which extends through the hollow rod 11, is joined to the cylinder body 4 of the clamping tool 1, with the other end of the hose 12 being joined to a hydraulic compressor 13. An operator 14 standing on the ground moves the hollow rod 11 so as to allow the clamping tool 1 at the tip of the hollow rod 11 to be engaged with an electric wire 16 held in a high position by a utility pole 15. Under this condition, the compressor 13 is operated so as to enable the clamping tool to perform the functions described previously and, thus, to cut away the electric wire 16.

The clamping tool can also be used for connecting two electric wires held by utility poles. In this case, two electric wires are arranged to contact each other at the free ends and the contact region is covered with a connector. Under this condition, the connector is compressed by operating the clamping tool as described previously so as to achieve a desired connection.

As described above, a heavy load is applied to the clamping head. In the conventional clamping tool described above, the clamping head is formed of a material capable of withstanding repeated use of the clamping tool. For example, the clamping head is formed of a Cr-Mo steel which exhibits a high tensile strength and a high resistance to fatigue. However, the Cr-Mo steel is very heavy, having a specific gravity of 7.8. Since the clamping tool is typically used for cutting an electric wire stretched at a high position or for connecting electric wires held at a high position, it is necessary for the operator operating the clamping tool on the ground to bear a heavy burden. Needless to say, a heavy clamping tool causes the operator to become tired in a short time, leading to a low working efficiency. Also, the clamping tool is often swung, making it difficult to position the clamping tool as desired promptly. This also leads to a low working efficiency. Further, the recent trend toward automation of the cutting or connecting operation raises demands reduction in the weight of the clamping tool.

Under the circumstances, it has been proposed to use a light Ti alloy, e.g., Ti-6Al-4V having a specific gravity of 4.5, for forming the clamping head of the clamping tool. A clamping head formed of the Ti alloy has already been put to practical use in some cases. However, the Ti alloy is not satisfactory in the resistance to fatigue, with the result that the clamping head formed of the Ti alloy tends to be cracked when used repeatedly. In other words, the clamping head formed of the Ti alloy is not satisfactory in reliability. What should also be noted is that the cracked pieces of the clamping head formed of the Ti alloy are scattered at a high speed. As a result, the cracked pieces run a distance of as much as 20 to 30 meters during the cutting or connecting operation of electric wires. Thus, it is unavoidable for the operator to be put under a dangerous condition. Further, the clamping head formed of the Ti alloy noted above is costly, compared with the conventional clamping head formed of a Cr-Mo steel, leading to a high manufacturing cost of the clamping tool.

SUMMARY OF THE INVENTION

An object of the present invention is to provide a clamping tool comprising a clamping head which is light, has a high Young's modulus, exhibits a high fatigue resistance and is free from danger of cracking of the clamping head and scattering of the cracked clamping head, thereby ensuring a safe operating environment for an operator of the clamping tool, lessening the burden given to the operator, and improving the working efficiency.

Another object of the present invention is to provide a clamping tool having a markedly lowered weight and capable of preventing the biting between the cylinder member and the ram member.

According to the present invention, there is provided a clamping tool, comprising a clamping head, a cylinder member fit with the edge portion of the clamping head, a ram member mounted to and movably arranged within the cylinder member, a first die member mounted to the clamping head, and a second die member arranged to face the first die member and moved by the ram member toward and away from the first die member, wherein at least the clamping head is formed of a composite material prepared by dispersing at least one kind of a reinforcing material selected from the group consisting of ceramic fibers, ceramic whiskers and ceramic particles into a matrix metal consisting of an aluminum alloy or a magnesium alloy.

FIG. 3 shows a clamping tool 21 according to one embodiment of the present invention. As shown in the drawing, the clamping tool 21 comprises a clamping head 22, which is formed of a composite material prepared by dispersing at least one kind of a reinforcing material 23 selected from the group consisting of ceramic fibers, ceramic whiskers and ceramic particles into a matrix metal 24 consisting of an aluminum alloy or a magnesium alloy. A substantially elliptical hollow portion 25 is formed by cutting a front portion of the clamping head 22. A cylinder member is mounted to the lower portion of the clamping head 22. The cylinder member noted above consists of a cylinder body 26 fit with the lower portion of the clamping head 22 and a piston rod 27 inserted into the cylinder body 26. The piston rod 27 is allowed to make a reciprocating motion within the cylinder body 26 by, for example, a hydraulic system, not shown. Further, a ram member consisting of a ram head 28 and a ram body 29 joined to the ram head 28 in the vertical direction by, for example, a screw is inserted into the cylinder body 26. The ram body 29 is formed of a cylinder having a bottom to which the piston rod 27 is joined. A spring 30 is wound about the piston rod 27 housed within the ram body 29. When the pushing force of the piston rod 27 is released, the spring 30 permits the ram body 29 to be brought back to the original position. A first die member $31_1$ is mounted within the hollow portion 25 of the clamping head 22. On the other hand, a second die member $31_2$ is mounted to the upper surface of the ram head 28 in a manner to face the first die member $31_1$.

The aluminum alloy used as the matrix metal of the composite material includes, for example, a high strength alloy such as Al-Cu-Mg series alloy and Al-Zn-Mg series alloy. Other alloys such as Al-Mg-Si series alloy, Al-Mn series alloy and Al-Si series alloy can also be used as the matrix metal. To be more specific, the aluminum alloys used in the present invention include AA2024, AA5052, AA6061, AA7075, etc. In particular, AA7075 exhibits a mechanical strength higher than those of other aluminum alloys and, thus, it is particularly desirable to use AA7075 in the present invention. When it comes to the magnesium alloy, it is desirable to use, for example, ASTM-AZ91C. The specific alloy acting as the matrix metal of the composite material should be selected in view of, for example, the environment under which the clamping tool is actually used.

As described previously, a reinforcing material selected from the group consisting of ceramic fibers, ceramic whiskers and ceramic particles are dispersed into a matrix metal so as to prepare the composite material used for forming, for example, the clamping head. The ceramic fibers used in the present invention include, for example, alumina continuous fibers, carbon continuous fibers, silicon carbide continuous fibers, boron continuous fibers, alumina short fibers, and alumina-silica short fibers. The ceramic whiskers used in the present invention include, for example, silicon carbide whiskers, titanium boride whiskers, potassium titanate whiskers, and aluminum borate whiskers. Further, the ceramic particles used in the present invention include, for example, alumina particles, silicon carbide particles, and silicon nitride particles. These ceramic materials can be used singly or in the form of a mixture consisting of a plurality of these ceramic materials. It is particularly desirable to use at least one of the silicon carbide whiskers and the silicon carbide particles as the reinforcing material in order to enable the resultant composite material to exhibit an improved mechanical strength and to suppress the manufacturing cost of the composite material.

It is desirable to disperse the reinforcing material into the matrix metal at a space loading ratio of 5 to 50%. If the space loading ratio of the reinforcing material is lower than 5%, it is difficult to obtain a composite material exhibiting a sufficiently high mechanical strength. If the space loading ratio of the reinforcing material exceeds 50%, however, it is difficult to apply a shaping process such as the die casting or forging to the resultant composite material. Preferably, the space loading ratio of the reinforcing material should fall within a range of between 15 and 35%.

For preparing the clamping head, it is desirable to use a composite material prepared by dispersing the reinforcing material into the matrix metal in particular fashions described below:

(1) In the case of using at least one of the ceramic short fibers and the ceramic whiskers as the reinforcing material, the reinforcing material should be dispersed into the matrix metal such that the reinforcing material is oriented along the bent portion of the matrix metal, as shown in FIG. 3. To be more specific, the clamping head 22 is formed of a composite material prepared by dispersing the reinforcing material 23, e.g., ceramic whiskers, into the matrix metal 24 consisting of an aluminum alloy or a magnesium alloy such that the whiskers are oriented along the bent portion of the matrix metal 24 over the entire region of the clamping head 22.

It is desirable to use as the reinforcing material the ceramic short fibers and ceramic whiskers. It is particularly desirable to use silicon carbide short fibers and silicon carbide whiskers. Further, the space loading ratio of the reinforcing material in the matrix metal should fall within a range of between 5 and 50%, preferably between 15 and 35%, as described previously.

(2) A composite material prepared by selectively dispersing the reinforcing material into the inner peripheral region along the bent portion of the matrix metal should be used forming the clamping head, as shown in FIG. 4. To be more specific, the clamping head 22 should be formed of a composite material prepared by selectively dispersing the reinforcing material 23, e.g., ceramic whiskers, into the inner peripheral region along the bent portion of the matrix metal 24 consisting of an aluminum alloy or a magnesium alloy.

It is desirable to use at least one of silicon carbide whiskers and silicon carbide particles as the reinforcing material in order to enable the resultant composite material to exhibit an improved mechanical strength and to suppress the manufacturing cost of the clamping head.

It is desirable to selectively disperse the reinforcing material into the matrix metal with a space loading ratio of 10 to 50%. If the space loading ratio of the reinforcing material is lower than 10%, it is difficult to enable the resultant composite material to exhibit a high mechanical strength adapted for a clamping head. If the space loading ratio of the reinforcing material exceeds 50%, however, it is difficult to apply a shaping process such as the die casting or forging to the resultant composite material. Preferably, the space loading ratio of the reinforcing material in the matrix metal should fall within a range of between 15 and 45%.

Where the reinforcing material is selectively dispersed into the peripheral region along the bent portion of the matrix metal, it is of course possible for the fibers or whiskers of the reinforcing material to be oriented along the bent portion.

(3) The clamping head should be formed of a composite material prepared by dispersing the reinforcing material into the matrix metal such that the space loading ratio of the reinforcing material in the matrix metal is gradually lowered from the innermost region along the bent portion of the matrix metal toward the outermost region. In other words, the space loading ratio in question should be highest in the innermost region along the bent portion and lowest in the outermost region, and the space loading ratio should be gradually changed.

It is desirable to use at least one of silicon carbide whiskers and silicon carbide particles as the reinforcing material in order to enable the resultant composite material to exhibit an improved mechanical strength and to suppress the manufacturing cost of the clamping head. On the other hand, the space loading ratio of the reinforcing material in the inner peripheral region along the bent portion should fall within a range of between 10 and 50%, preferably between 15 and 45%.

The clamping tool of the present invention comprises a clamping head, a cylinder member, and a ram member. It is desirable for at least the clamping head and the cylinder member of these members of the clamping tool to be formed of a composite material prepared by dispersing at least one reinforcing material selected from the group consisting of ceramic fibers, ceramic whiskers, and ceramic particles into a matrix metal consisting of an aluminum alloy or a magnesium alloy. Particularly, it is desirable for all of these clamping head, the cylinder member and the ram member to be formed of the composite material described above.

According to the clamping tool of the present invention, at least the clamping head is formed of a composite material prepared by dispersing at least one reinforcing material selected from the group consisting of ceramic fibers, ceramic whiskers and ceramic particles into a matrix metal consisting of an aluminum alloy or a magnesium alloy. The composite material thus prepared is light, exhibits a high Young's modulus and has a high fatigue resistance. It follows that the clamping head formed of the composite material specified in the present invention is unlikely to be cracked even when a heavy load is repeatedly applied thereto. Of course, it is possible to prevent the cracked pieces of the clamping head from being scattered. Where a clamping tool comprising the particular clamping head is used for cutting, for example, an electric wire stretched between utility poles, the operator of the clamping tool is enabled to perform the cutting operation under a safe environment without worrying about a danger of scattering of the cracked pieces of the clamping head. In addition, the operator need not bear a heavy burden of the clamping tool, leading to an improved working efficiency.

Where the clamping head is formed of a composite material prepared by dispersing at least one reinforcing material selected from the group consisting of ceramic short fibers and ceramic whiskers into the matrix metal such that these fibers or whiskers are oriented along the bent portion of the matrix metal, it is possible to decrease the weight of the clamping head. It is also possible to markedly increase the Young's modulus and the fatigue resistance of the clamping head, with the result that the cracking of the clamping head caused by a repeated application of load can be suppressed to a markedly high extent.

It should also be noted that, where the clamping head is formed of a composite material prepared by selectively dispersing the reinforcing material into the inner region along the bent portion of the matrix metal, it is possible to decrease the weight of the clamping head and to lower the manufacturing cost of the clamping head. It is also possible to improve the Young's modulus and the fatigue resistance at the desired portions of the clamping head.

Further, in the case where the clamping head is formed of a composite material prepared by dispersing the reinforcing material into the matrix metal such that the space loading ratio of the reinforcing material in the matrix metal is gradually lowered from the innermost region along the bent portion of the matrix metal toward the outermost region, it is possible to decrease the weight of the clamping head and to markedly improve both the Young's modulus and the fatigue resistance of the clamping head. As a result, the clamping tool comprising the clamping head of the particular construction is enabled to produce prominent effects. Specifically, the clamping head can be prevented from being cracked by a repeated application of load, leading to a long life of the clamping tool.

In addition to the clamping head, at least the cylinder member included in the clamping tool is also formed of the composite material described above in the present invention. It should be noted that the composite material used in the present invention exhibits an excellent wear resistance, with the result that the biting of the ram member into the cylinder body can be prevented without fail during operation of the clamping tool. It follows that the clamping tool of the present invention can be used satisfactorily over a long period of time.

To be more specific, the conventional clamping head is formed of a Ti alloy. Since the Ti alloy has a somewhat low Young's modulus, the clamping head formed of the Ti alloy is warped greater upon receipt of load than the clamping head formed of a Cr-Mo steel. The Ti alloy is also unsatisfactory in its wear resistance. As a result, the clamping tool including a clamping head and a cylinder member, particularly cylinder body, each formed of the Ti alloy, gives rise to a biting problem. To be more specific, if the linear motion of the ram body within the cylinder body is impaired during the operation of the clamping tool by the warping of the clamping head, the ram body is caused to bite the cylinder body because the cylinder body is formed of the Ti alloy which is unsatisfactory in its wear resistance. The biting problem is solved in the prior art by improving the structure of each of the cylinder member and the ram member. In this case, however, the construction of the clamping tool is made complex and leads to a high manufacturing cost of the clamping tool.

On the other hand, each of the clamping head and the cylinder member is formed of the particular composite material exhibiting a high wear resistance in the present invention so as to prevent without fail the biting problem of the ram body into the cylinder body during the operation of the clamping tool. What should be noted is that the structure of each of the cylinder member and the ram member need not be modified in the present invention as in the prior art. In other words, the clamping tool of the present invention comprising the cylinder member and the ram member of a simple structure permits cutting an electric wire or the like satisfactorily over a long period of time. In addition, the use of the particular composite material for forming the clamping head and the cylinder member permits further decreasing the weight of the clamping tool.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is an oblique view showing a laminated composite body prepared in Example 22 of the present invention; and FIG. 6 is an oblique view showing a columnar laminated composite body prepared in Example 23 of the present invention.

DETAILED DESCRIPTION OF THE PREFERRED EMBODIMENTS

Figure 1:
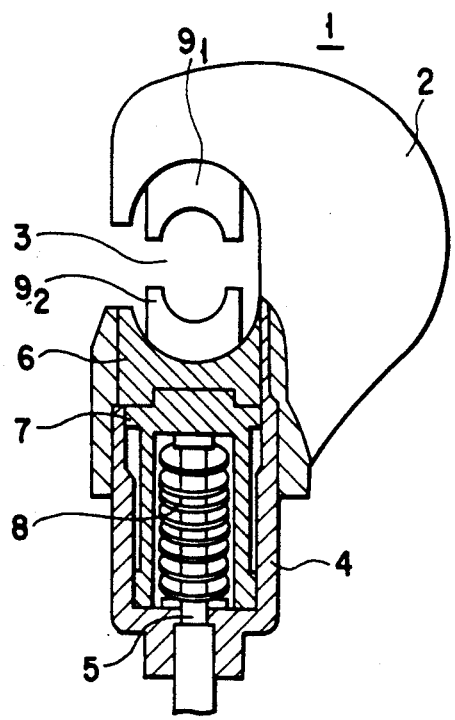
FIG. 1 is a front view, partly broken away, showing a clamping tool of a general construction.
Figure 2:
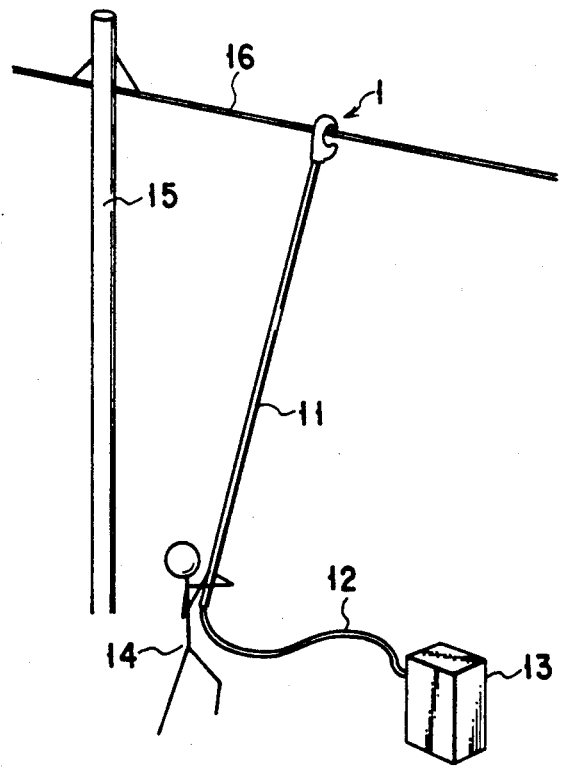
FIG. 2 schematically shows how to use the clamping tool shown in FIG. 1 for cutting an electric wire.

Let us describe more in detail the present invention with reference to Examples which follow.

EXAMPLE 1

A preform having a space loading ratio of 50% was prepared by bundling in an arcuate form alumina-based fibers, i.e., $Al_2O_3$ 85%, $SiO_2$ 15%, average fiber diameter of 17 to 18 $\mu$m, tensile strength of 1.8 GPa, and Young's modulus of 210 GPa, followed by adding a small amount of a binder containing a silica component to the bundled fibers and subsequently shaping the resultant fibers. Then, the preform was dried and put in a mold of a melt forging machine and impregnated under pressure with a molten aluminum alloy (AA7075) having a temperature of 750° C. Further, the impregnated preform was solidified under such a high pressure as 100 MPa, thus preparing a clamping head consisting of a composite material.

The clamping head thus prepared consists of a composite material in which the alumina-based fibers acting as a reinforcing material are dispersed in the aluminum alloy (AA7075) acting as the matrix metal. A sample of the clamping head thus prepared was subjected to solubilizing treatment in accordance with ASTM-B597 and then to an age-hardening treatment. After these treatments, various properties of the sample were measured including the Young's modulus, tensile strength, 0.2% withstanding strength, fatigue strength, and specific gravity. The fatigue strength was measured in accordance with the rotary bending fatigue strength test specified in ASTM-E616. Table 1 shows the results together with the values for Cr-Mo steel (SCM435) and Ti alloy (Ti-6Al-4V).

TABLE 1

|  | Example 1* | Cr—Mo Steel | Ti Alloy |
| --- | --- | --- | --- |
| Young's modulus (GPa) | 150 (120) | 195 | 110 |
| Tensile strength (MPa) | 900 (170) | >980 | 980 |
| 0.2% withstanding strength (MPa) | 830 (>140) | >830 | 920 |
| Fatigue strength (MPa) | 760 | 540 | 490 |
| Specific gravity | 2.9 | 7.8 | 4.5 |

*The measured values for Example 1 denote the values in a direction parallel with the alumina-based fibers. Also, the values within the parenthesis denote the values in a direction perpendicular to the alumina-based fibers.

EXAMPLE 2

A preform having a space loading ratio of 50% was prepared by bundling in an arcuate form silicon carbide (SiC) fibers having an average fiber diameter of 10 to 15 $\mu$m, a tensile strength of 2500 MPa, and a Young's modulus of 190 GPa, followed by adding a small amount of a binder containing a silica component to the bundled fibers and subsequently shaping the resultant fibers. Then, the preform was dried and put in a mold of a melt forging machine and impregnated under pressure with a molten aluminum alloy (AA5052) having a temperature of 750° C. Further, the impregnated preform was solidified under such a high pressure as 100 MPa, thus preparing a clamping head consisting of a composite material.

A sample of the clamping head thus prepared was subjected to a solubilizing treatment in accordance with ASTM-B597 and then to an age-hardening treatment. After these treatments, various properties of the sample were measured. Table 2 shows the results.

TABLE 2

|  | Example 2* |
| --- | --- |
| Young's modulus (GPa) | 120 (100) |
| Tensile strength (MPa) | 880 (90) |
| 0.2% withstanding strength (MPa) | >830 (>70) |
| Fatigue strength (MPa) | 650 |
| Specific gravity | 2.7 |

*The measured values for Example 2 denote the values in a direction parallel with the SiC fibers. Also, the values within the parenthesis denote the values in a direction perpendicular to the SiC fibers.

As apparent from Tables 1 and 2, the clamping head incorporated in the clamping tool of the present invention is fully comparable in mechanical strength with the conventional clamping head consisting of a Cr-Mo steel, exhibits Young's modulus and fatigue resistance higher than those of the clamping head formed of a Ti alloy, and permits lowering the weight to ⅓ to ⅔ the weight of the conventional clamping head.

EXAMPLE 3

Four kinds of preforms having space loading ratios of 10%, 17%, 25% and 40% Were prepared by dipping SiC whiskers having an average diameter of 0.1 to 1.0 $\mu$m, a tensile strength of 14 GPa, and a Young's modulus of 480 GPa in an organic binder, followed by forming the whiskers into a columnar shape by means of vacuum suction and subsequent step of compression. Each of the preforms thus prepared was dried and, then, sintered at 800° C. The four sintered preforms of each kind were put in a mold of a melt forging machine and impregnated under pressure with a molten aluminum alloy of AA2024, AA5052, AA6061 or AA7075, respectively. Further, the impregnated preforms numbering 16 in all, every four of one kind, were solidified under such a high pressure as 100 MPa and, then, taken out of the mold, whereby 16 billets were obtained. The billets were subjected to extrusion at 420° C. and, then, to a hot forging treatment, thus preparing 16 kinds of clamping heads.

Samples of these clamping heads were subjected to a solubilizing treatment in accordance with ASTM-B597 and to an age-hardening treatment. After these treatments, the properties of these samples were measured. Table 3 shows the results. It should be noted that the values without parentheses shown in Table 3 denote the tensile strength with a unit of MPa. On the other hand, the values put in parenthesis in Table 3 denote the fatigue strength with a unit of MPa.

TABLE 3

| Mother Material | Space Loading Ratio of Sic Whiskers | | | |
|---|---|---|---|---|
| | 10% | 17% | 25% | 40% |
| AA2024 | 620 | 660 | 780 | 760 |
| | (590) | (610) | (710) | (700) |
| AA5052 | 490 | 580 | 620 | 660 |
| | (460) | (540) | (590) | (600) |
| AA6061 | 500 | 600 | 620 | 660 |
| | (470) | (570) | (580) | (610) |
| AA7075 | 660 | 720 | 810 | 780 |
| | (610) | (660) | (750) | (710) |

Further, Table 4 shows the Young's modulus, 0.2% withstanding strength, specific gravity and fatigue strength of the clamping head formed of the SiC whisker/AA7075 composite material having a space loading ratio of 25%.

TABLE 4

| Young's modulus (GPa) | 130 |
|---|---|
| 0.2% withstanding strength (MPa) | 750 |
| Fatigue strength (MPa) | 740 |
| Specific gravity | 2.8 |

As apparent from Tables 3 and 4, the clamping head included in the clamping tool of the present invention has weight about ⅗ of that of the Ti alloy and, thus, is superior to the Ti alloy in the specific strength, though the clamping tool included in the clamping tool of the present invention is somewhat inferior to the Ti alloy in the tensile strength. Further, the clamping head noted above is superior to the Ti alloy in its fatigue strength.

EXAMPLE 4

A preform having a space loading ratio of 50% was prepared by bundling in an arcuate form SiC fibers having an average fiber diameter of 10 to 15 μm, a tensile strength of 2500 MPa, and a Young's modulus of 190 GPa, followed by adding a small amount of a binder containing a silica component to the bundled fibers and subsequently shaping the resultant fibers. Then, the preform was dried and put in a mold of a melt forging machine and impregnated under pressure with a molten magnesium alloy (ASTM- AZ91C) having a temperature of 750°. Further, the impregnated preform was solidified under such a high pressure as 100 MPa, thus preparing a clamping head consisting of a composite material.

A sample of the clamping head thus prepared was subjected to a solubilizing treatment in accordance with ASTM-B597 and then to an age-hardening treatment. After these treatments, various properties of the sample were measured. Table 5 shows the results.

TABLE 5

| | Example 4* |
|---|---|
| Young's modulus (GPa) | 110 (100) |
| Tensile strength (MPa) | 820 (90) |
| 0.2% withstanding strength (MPa) | >780 (>80) |
| Fatigue strength (MPa) | 600 |
| Specific gravity | 2.1 |

*The measured values without parenthesis for Example 4 denote the values in a direction parallel with the SiC fibers. Also, the values within the parenthesis denote the values in a direction perpendicular to the SiC fibers.

EXAMPLE 5

A preform having a space loading ratio of 30% was prepared by dipping SiC whiskers having an average diameter of 0.1 to 1.0 μm, a tensile strength of 14 GPa, and a Young's modulus of 480 GPa in an organic binder, followed by forming the whiskers into a columnar shape by means of vacuum suction and subsequent step of compression. The preform thus prepared was dried and, then, sintered at 800° C. The sintered preform was put in a mold of a melt forging machine and impregnated under pressure in an argon gas atmosphere with a molten magnesium alloy (ASTM-AZ91C). Further, the impregnated preform was solidified under such a high pressure as 100 MPa and, then, taken out of the mold, whereby a billet was obtained. The billet was subjected to extrusion at 420° C. and, then, to a hot forging treatment, thus preparing a clamping head.

A sample taken out of the clamping head thus prepared was subjected to a solubilizing treatment in accordance with ASTM-B597 and to an age-hardening treatment. After these treatments, the properties of the sample were measured. Table 6 shows the results.

TABLE 6

| Young's modulus (GPa) | 120 |
|---|---|
| Tensile strength (MPa) | 510 |
| 0.2% withstanding strength (MPa) | 460 |
| Fatigue strength (MPa) | 460 |
| Specific gravity | 2.1 |

As apparent from Tables 5 and 6, the clamping head prepared in each of Examples 4 and 5 has a mechanical strength higher than that of the conventional clamping head and is smaller in weight than the conventional clamping head.

EXAMPLE 6

SiC particles containing at least 99% of SiC, having an average particle diameter of 4.6 μm, and a specific gravity of 3.20 were mixed with a powdery aluminum alloy (AA7075) such that a space loading ratio of the SiC particles becomes 25%. These particles and powdery material were uniformly mixed in a vibrating ball mill, followed by subjecting the resultant mixture to an extrusion treatment and subsequently to a sintering treatment. Further, a hot forging treatment was applied to the sintered material, thus preparing a clamping head.

A sample taken out of the clamping head thus prepared was subjected to a solubilizing treatment in accordance with ASTM-B597 and to an age-hardening treatment. After these treatments, the properties of the sample were measured. Table 7 shows the results.

TABLE 7

| Young's modulus (GPa) | 120 |
|---|---|
| Tensile strength (MPa) | 800 |
| 0.2% withstanding strength (MPa) | 750 |
| Fatigue strength (MPa) | 690 |
| Specific gravity | 2.8 |

As apparent from Table 7, the clamping head included in a clamping tool of the present invention, which is formed of a composite material prepared by dispersing a reinforcing material of SiC particles into an aluminum alloy, has a mechanical strength higher than that of the conventional clamping head. Also, the clamping head of the present invention has a weight smaller than that of the conventional clamping head.

EXAMPLES 7 TO 12

Figure 3:
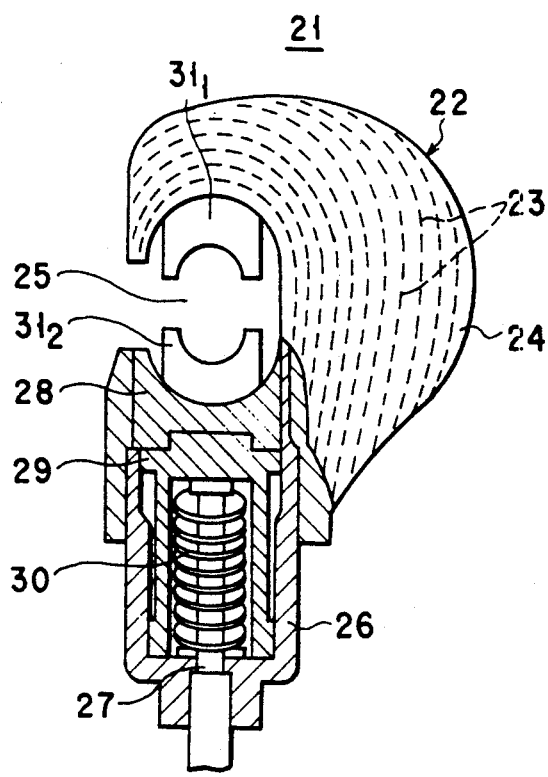
FIG. 3 is a front view, partly broken away, showing a clamping tool according to one embodiment of the present invention.

Six kinds of clamping tools constructed as shown in FIG. 3 were assembled by using the clamping heads prepared in Examples 1 and 6.

COMPARATIVE EXAMPLES 1 AND 2

Two kinds of clamping tools constructed as shown in FIG. 5 were assembled by using clamping heads formed of a Ti alloy (Ti-6Al-4V) and a Cr-Mo steel (SCM435).

Comparative tests were applied to the clamping tools assembled in Examples 7 to 12 and Comparative Examples 1 and 2. Specifically, a wiring material similar to an electric wire was held between a pair of the first and second die members. Under this condition, the piston rod was moved upward by, for example, a hydraulic compressor so as to move the ram body joined to the piston rod in the same direction along the cylinder body. At the same time, the second die member mounted to the ram head was moved toward the first die member so as to apply a load of 8 tons to the wiring material held between the first and second die members and, thus, to compress the wiring material. The compressing operation was repeatedly applied to the wiring material so as to measure the number of crack occurrences in the clamping head and the occurrence of scattering of the cracked pieces. Where biting took place between the cylinder body and the ram body during the compressing operation, the clamping tool was dismantled so as to recover the normal state. Then, the compressing operation was repeatedly applied again to the wiring material so as to measure the number of compressing operations leading to the crack occurrence in the clamping head and the occurrence of scattering of the cracked pieces. Table 8 shows the results.

TABLE 8

| | Material of clamping head | The number of compressing operations* | Scattering of cracked pieces |
|---|---|---|---|
| Example 7 | composite material | 40,000 times | none |
| Example 8 | composite material | 35,000 times | none |
| Example 9 | composite material | 40,000 times | none |
| Example 10 | composite material | 30,000 times | none |
| Example 11 | composite material | 20,000 times | none |
| Example 12 | composite material | 35,000 times | none |

TABLE 8-continued

| | Material of clamping head | The number of compressing operations* | Scattering of cracked pieces |
|---|---|---|---|
| Comparative Example 1 | Ti alloy | 20,000 times | scattered |
| Comparative Example 2 | Cr-Mo steel | 40,000 times | none |

EXAMPLES 13 TO 18

Clamping tools were assembled substantially as in Examples 7 to 12, except that the cylinder members consisting of the cylinder bodies and the piston rods and the ram members consisting of the ram heads and the ram bodies, which are included in the clamping tools, were formed of the composite materials equal to those used for preparing the clamping heads in Examples 1 to 6.

COMPARATIVE EXAMPLES 3 AND 4

Clamping tools were assembled substantially as in Comparative Examples 1 and 2, except that, in Comparative Example 3, the cylinder members and the ram members included in the clamping tool were formed of the Ti alloy equal to that used in Comparative Example 1 for preparing the clamping head and, in Comparative Example 4, the cylinder members and the ram members included in the clamping tool were formed of the Cr-Mo steel equal to that used in Comparative Example 2 for preparing the clamping head.

Comparative tests were applied to the clamping tools assembled in Examples 13 to 18 and Comparative Examples 3 and 4. Specifically, a wiring material similar to an electric wire was held between a pair of the first and second die members. Under this condition, the piston rod was moved upward by, for example, a hydraulic compressor so as to move the ram body joined to the piston rod in the same direction along the cylinder body. At the same time, the second die member mounted to the ram head was moved toward the first die member so as to apply a load of 8 tons to the wiring material held between the first and second die members and, thus, to compress the wiring material. The compressing operation was repeatedly applied to the wiring material so as to measure the number of compressing operations leading to the biting occurrence between the cylinder body and the ram body. Table 9 shows the results.

TABLE 9

| | Material of clamping head, cylinder body and ram body | The number of compressing operations* |
|---|---|---|
| Example 13 | composite material | more than life of clamping head |
| Example 14 | composite material | more than life of clamping head |
| Example 15 | composite material | more than life of clamping head |
| Example 16 | composite material | more than life of clamping head |
| Example 17 | composite material | more than life of clamping head |
| Example 18 | composite material | more than life of clamping head |
| Comparative | Ti alloy | 15,000 |

TABLE 9-continued

| | Material of clamping head, cylinder body and ram body | The number of compressing operations* |
|---|---|---|
| Example 3 Comparative Example 4 | Cr—Mo steel | 35,000 |

Note:
*The number of compressing operations leading to the biting occurrence between the cylinder body and the ram body.

As apparent from Table 8, the clamping head included in the clamping tool of the present invention exhibits an excellent durability, making it possible to use the clamping tool for cutting, for example, an electric wire stretched in a high position without worrying about a danger of cracking of the clamping head and scattering of the cracked pieces of the clamping head.

On the other hand, Table 9 shows that, when it comes to the clamping tool manufactured in Comparative Example 3, in which all of the clamping head, the cylinder body, and the ram body were formed of a Ti alloy, biting takes place in the repeated test of compressing operation even if the number of repetitions is smaller than the life of the clamping head (20,000 times). In the clamping tool of the present invention, however, troubles caused by the biting do not take place even if the number of repetitions of the compressing test is larger than the life of the clamping head, e.g., 40,000 times in the case of the clamping head in Example 13. It follows that the clamping tool of the present invention can be used satisfactorily for the cutting operation of an electric wire or the like over a long period of time. That should also be noted is that it is possible to further decrease the weight of the clamping tool by using a composite material specified in the present invention for forming all of the clamping head, the cylinder member consisting of the cylinder body and the piston rod and the ram member consisting of the ram body and the ram head.

EXAMPLE 19

Two kinds of preforms each having space loading ratios of 17% or 25% were prepared by dipping SiC whiskers having an average diameter of 0.1 to 1.0 μm, a tensile strength of 14 GPa, and a Young's modulus of 480 GPa in an organic binder, followed by forming the SiC whiskers into a columnar shape by means of vacuum suction and subsequently compressing the shaped body. Then, each of the preforms was dried and sintered at 800° C. The two sintered preforms of each kinds were put in a mold of a melt forging machine and impregnated under pressure with a molten aluminum alloy of AA6061 or AA7075, respectively. Further, the impregnated preforms numbering 4 in all, every two of one kind, were solidified under such a high pressure as 100 MPa, and then taken out of the mold, whereby 4 billets were obtained. The billets were subjected to an extrusion at 420° C. and, then, to a hot forging, thus preparing four kinds of clamping heads in which the SiC whiskers are oriented along the bent portion of the matrix metal as shown in FIG. 3.

Test pieces were taken from each kind of the clamping heads by cutting the clamping head in directions parallel with and perpendicular to the direction of orientation of the whiskers. These test pieces were subjected to a solubilizing treatment in accordance with ASTM-B598 and to an age-hardening treatment so as to measure the properties (tensile strength and fatigue strength) of the test pieces after these treatments. Table 10 shows the results. It should be noted that the values without parenthesis shown in Table 10 denote the tensile strength (MPa), with the values put in parenthesis denoting the fatigue strength (MPa).

TABLE 10

| Mother Material | | Space loading Ratio of Sic Whiskers | |
|---|---|---|---|
| | | 17% | 25% |
| AA6061 | Test piece cut in parallel direction | 600 (570) | 620 (580) |
| | Test piece cut in perpendicular direction | 480 (420) | 500 (390) |
| AA7075 | Test piece cut in parallel direction | 720 (660) | 810 (750) |
| | Test piece cut in perpendicular direction | 580 (520) | 650 (480) |

EXAMPLE 20

Figure 4:
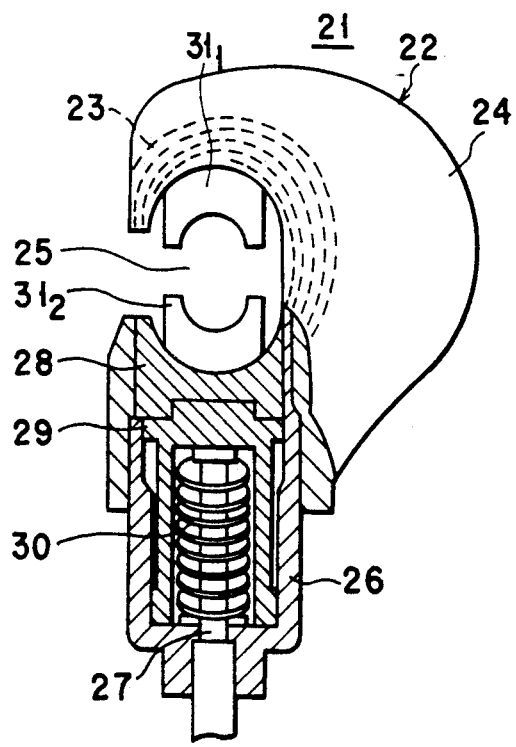
FIG. 4 is a front view, partly broken away, showing a clamping tool according to another embodiment of the present invention.

Two kinds of preforms each having space loading ratios of 25% or 40% were prepared by dipping SiC whiskers having an average diameter of 0.1 to 1.0 μm, a tensile strength of 14 GPa, and a Young's modulus of 480 GPa in an organic binder, followed by forming the SiC whiskers into a columnar shape by means of vacuum suction and subsequently compressing the shaped body. Then, each of preforms was dried and sintered at 800° C. The two sintered preforms of each kind were put in a mold of a melt forging machine and impregnated under pressure with a molten aluminum alloy of AA6061 or AA7075, respectively. Further the impregnated preforms numbering 4 in all, every two of one kind, were solidified under such a high pressure as 100 MPa, then, taken out of the mold, whereby four columnar billet were obtained. The columnar billets were split into halves along a diameter in the circular cross section of the billet. Then, the each of split halfs were joined to another split half of the billet containing the metal matrix of AA7075, followed by subjecting the resultant columnar billets to an extrusion at 420° C. and, then, to a hot forging, thus preparing four kinds of clamping heads in which the SiC whiskers are oriented along the inner region of the bent portion of the matrix metal as shown in FIG. 4.

Test pieces were taken from each kind of the clamping heads and subjected to a solubilizing treatment in accordance with ASTM-B598 and to an age-hardening treatment so as to measure the properties (tensile strength and fatigue strength) of the test pieces after these treatments. Table 11 shows the results. It should be noted that the values without parenthesis shown in Table 11 denote the tensile strength (MPa), with the values put in parentheses denoting the fatigue strength (MPa).

TABLE 11

| Mother Material | Space Loading Ratio of Sic Whiskers | |
|---|---|---|
| | 25% | 40% |
| AA6061 | 620 (580) | 660 (610) |
| AA7075 | 810 | 780 |

TABLE 11-continued

| Mother Material | Space Loading Ratio of Sic Whiskers | |
| --- | --- | --- |
| | 25% | 40% |
| | (750) | (710) |

EXAMPLE 21

Two kinds of preforms each having space loading ratios of 17% or 25% were prepared by dipping SiC whiskers having an average diameter of 0.1 to 1.0 μm, a tensile strength of 14 GPa, and a Young's modulus of 480 GPa in an organic binder, followed by pouring the whiskers into a mold shaped to conform with the inner peripheral region of the bent portion of the clamping head. Then, each of preforms was dried and sintered at 800° C. The two sintered preforms of each kind were put in a predetermined portion of a mold shaped to conform with the clamping head and impregnated under pressure with a molten aluminum alloy of AA6061 or AA7075, respectively. Further, the impregnated preforms numbering 4 in all, every two of one kind, were solidified such a high pressure as 100 MPa, and then, taken out of the mold, thus preparing four kinds of clamping heads.

The clamping heads thus prepared were cut so as to observe a cross section of the clamping head. It has been found that the SiC whiskers were arranged in the inner peripheral region along the bent portion of the matrix metal so as to form a composite structure, as shown in FIG. 4. Test pieces were taken from each kind of the clamping heads by cutting the clamping head in directions parallel with and perpendicular to the direction of orientation of the whiskers. These test pieces were subjected to a solubilizing treatment in accordance with ASTM-B598 and to an age-hardening treatment so as to measure the properties (tensile strength and fatigue strength) of the test pieces after these treatments. Table 12 shows the results. It should be noted that the values without parenthesis shown in Table 12 denote the tensile strength (MPa), with the values put in parenthesis denoting the fatigue strength (MPa).

TABLE 12

| Mother Material | Space Loading Ratio of Sic Whiskers | |
| --- | --- | --- |
| | 17% | 25% |
| AA6061 | 500 | 520 |
| | (450) | (470) |
| AA7075 | 600 | 660 |
| | (540) | (600) |

EXAMPLES 22 TO 27

Six kinds of clamping tools constructed as shown in FIG. 3 were assembled by using two kinds of the clamping heads prepared in Example 19, i.e., clamping head formed of the composite material of 25% SiC whisker/AA6061 and clamping head formed of the composite material of 25% SiC whisker/AA7075, two kinds of the clamping heads prepared in Example 20, i.e., clamping head including an inner peripheral region along the bent portion, which is formed of the composite material of 25% SiC whisker/AA6061, and clamping head including an inner peripheral region along the bent portion, which is formed of the composite material of 25% SiC whisker/AA7075, and two kinds of the clamping heads prepared in Example 21, i.e., clamping head including an inner peripheral region along the bent portion, which is formed of the composite material of 25% SiC whisker/AA6061, and clamping head including an inner peripheral region along the bent portion, which is formed of the composite material of 25% SiC whisker/AA7075.

EXAMPLE 28

Four kinds of preforms having space loading ratios of 5%, 15%, 25% and 35% were prepared by dipping SiC whiskers having an average diameter of 0.1 to 1.0 μm, a tensile strength of 14 GPa, and a Young's modulus of 480 MPa, in an organic binder, followed by forming the whiskers into a plate by means of vacuum suction and subsequently compressing the whisker plate. The preforms were impregnated under a pressurized condition with a molten aluminum alloy of AA7075 by a melt forging method. Then, a composite plate 41 having a space loading ratio of 5%, a composite plate 42 having a space loading ratio of 15%, a composite plate 43 having a space loading ratio of 25%, and a composite plate 44 having a space loading ratio of 35% were superposed one upon the other in the order mentioned, followed by compressing under heat the superposed structured, thereby preparing a laminated composite plate 45, as shown in FIG. 5. The laminated composite plate 45 was subjected to a hot forging, thus preparing a clamping head constructed such that the space loading ratio of the SiC whiskers is gradually decreased from the innermost region along the bent portion toward the outermost region. A clamping tool constructed as shown in FIG. 3 was assembled by using the clamping head thus prepared.

EXAMPLE 29

Four kinds of preforms having space loading ratios of 10%, 20%, 30% and 40% were prepared by dipping SiC whiskers having an average diameter of 0.1 to 1.0 μm, a tensile strength of 14 GPa. and a Young's modulus of 480 MPa, in an organic binder. followed by forming the whiskers into a cylindrical preform by means of rubber pressing. The preforms were impregnated under a pressurized condition with a molten aluminum alloy of AA7075 by a melt forging method. Then, a cylindrical composite body 51 having a space loading ratio of 10%, a cylindrical composite body 52 having a space loading ratio of 20%, a cylindrical composite body 53 having a space loading ratio of 30%, and a cylindrical composite body 54 having a space loading ratio of 40% were arranged in a concentric configuration as shown in FIG. 6, followed by applying a hot extrusion to the resultant structure, thereby preparing a laminated columnar composite body. The columnar composite body was split into halves along a diameter of the columnar composite body and, then, subjected to a hot forging, thus preparing a clamping head constructed such that the space loading ratio of the SiC whiskers is gradually decreased from the innermost region along the bent portion toward the outermost region. A clamping tool constructed as shown in FIG. 3 was assembled by using the clamping head thus prepared.

Load was repeatedly applied to each of the clamping tools assembled in Examples 22 to 29. Specifically, a wiring material similar to an electric wire was held between a pair of the first and second die members. Under this condition, the piston rod was moved upward by, for example, a hydraulic compressor so as to move the ram body joined to the piston rod in the same direction along the cylinder body. At the same time, the second die member mounted to the ram head was moved toward the first die member so as to apply a load of 8 tons to the wiring material held between the first and second die members and, thus, to compress the wiring material. The compressing operation was repeatedly applied to the wiring material so as to measure the number of compressing operations leading to the crack occurrence in the clamping head and the occurrence of scattering of the cracked pieces. Where biting took place between the cylinder body and the ram body during the compressing operation, the clamping tool was dismantled so as to recover the normal state. Then, the compressing operation was repeatedly applied again to the wiring material so as to measure the number of compressing operations leading to the crack occurrence in the clamping head and the occurrence of scattering of the cracked pieces. Table 13 shows the results together with the results for Comparative Examples 1 and 2, which were already shown in Table 8.

TABLE 13

|  | Material of clamping head | The number of compressing operations**** | Scattering of cracked pieces |
|---|---|---|---|
| Example 22 | composite* material | 25,000 times | none |
| Example 23 | composite* material | 40,000 times | none |
| Example 24 | composite** | 25,000 times | none |
| Example 25 | " | 40,000 times | none |
| Example 26 | " | 25,000 times | none |
| Example 27 | " | 40,000 times | none |
| Example 28 | composite*** material | 45,000 times | none |
| Example 29 | composite*** material | 50,000 times | none |
| Comparative Example 1 | Ti alloy | 20,000 times | scattered |
| Comparative Example 2 | Cr—Mo steel | 40,000 times | none |

Note:
*Composite material containing whiskers oriented along the bent portion of the matrix metal.
**Composite material containing whiskers selectively in the inner region along the bent portion.
***Composite material in which the space loading ratio of whiskers is gradually lowered from the innermost region along the bent portion toward the outermost region.
****The number of compressing operations leading to the crack occurrence in the clamping head.

EXAMPLES 30 TO 37

Clamping tools were assembled substantially as in Examples 22 to 29, except that the cylinder members consisting of the cylinder bodies and the piston rods and the ram members consisting of the ram heads and the ram bodies, which are included in the clamping tools, were formed of the 25% SiC whisker/AA7075 composite material equal to that prepared in Example 1.

Load was repeatedly applied to each of the clamping tools assembled in Examples 30 to 37. Specifically, a wiring material similar to an electric wire was held between a pair of the first and second die members. Under this condition, the piston rod was moved upward by, for example, a hydraulic compressor so as to move the ram body joined to the piston rod in the same direction along the cylinder body. At the same time, the second die member mounted to the ram head was moved toward the first die member so as to apply a load of 8 tons to the wiring material held between the first and second die members and, thus, to compress the wiring material. The compressing operation was repeatedly applied to the wiring material so as to measure the number of compressing operations leading to the biting occurrence between the cylinder body and the ram body. Table 14 shows the results together with the results for Comparative Examples 3 and 4 which were already Shown in Table 9.

TABLE 14

|  | Material of clamping head | Material of cylinder body and ram body | The number of compressing operations**** |
|---|---|---|---|
| Example 30 | composite material* | composite material | more than life of clamping head |
| Example 31 | composite material* | composite material | more than life of clamping head |
| Example 32 | composite material** | composite material | more than life of clamping head |
| Example 33 | composite material** | composite material | more than life of clamping head |
| Example 34 | composite material** | composite material | more than life of clamping head |
| Example 35 | composite material** | composite material | more than life of clamping head |
| Example 36 | composite material*** | composite material | more than life of clamping head |
| Example 37 | composite material*** | composite material | more than life of clamping head |
| Comparative Example 3 | Ti alloy | Ti alloy | 15,000 |
| Comparative Example 4 | Cr—Mo steel | Cr—Mo steel | 35,000 |

Note:
*Composite material containing whiskers oriented along the bent portion of the matrix metal.
**Composite material containing whiskers selectively in the inner region along the bent portion.
***Composite material in which the space loading ratio of whiskers is gradually lowered from the innermost region along the bent portion toward the outermost region.
****The number of compressing operations leading to the biting occurrence between the cylinder body and the ram body.

As apparent from Table 13, the clamping head included in the clamping tool of the present invention exhibits an excellent durability, making it possible to use the clamping tool for cutting, for example, an electric wire stretched in a high position without worrying about a danger of cracking of the clamping head and scattering of the cracked pieces of the clamping head.

On the other hand, Table 14 shows that, when it comes to the clamping tool manufactured in Comparative Example 3, in which all of the clamping head, the cylinder body, and the ram body were formed of a Ti alloy, biting takes place in the repeated test of compressing operation even if the number of repetitions is smaller than the life of the clamping head (20000 times). In the clamping tool of the present invention, however, troubles caused by the biting do not take place even if the number of repetitions of the compressing test is larger than the life of the clamping head, e.g., 40,000 times in the case of the clamping head in Example 31. It follows that the clamping tool of the present invention can be used satisfactorily for the cutting operation of an electric wire or the like over a long period of time. What should also be noted is that it is possible to further decrease the weight of the clamping tool by using a composite material specified in the present invention for forming all of the clamping head, the cylinder member consisting of the cylinder body and the piston rod and the ram member consisting of the ram body and the ram head.

As described above in detail, the present invention provides a clamping tool comprising a clamping head which is light, has a high Young's modulus, exhibits a high fatigue resistance, and is prevented from being cracked and, thus, is free from scattering of the cracked pieces. It follows that the clamping tool of the present invention permits lessening the burden applied to the operator, leading to an improved working efficiency, and enables the operator to perform, for example, the cutting of an electric wire under a safe environment. What should also be noted is that the biting between the cylinder member and the ram member can be prevented in the clamping tool of the present invention, with the result that the clamping tool can be used satisfactory over a long period of time.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A clamping tool, comprising:
   a clamping head;
   a cylinder member coupled to an edge portion of the clamping head;
   a ram member coupled to and movably arranged within the cylinder member;
   a first die member coupled to the clamping head; and
   a second die member arranged to face the first die member and movable by the ram member toward and away from the first die member;
   wherein at least the clamping head is formed of a composite material prepared by dispersing at least one reinforcing material selected from the group consisting of ceramic fibers, ceramic whiskers and ceramic particles into a matrix metal consisting essentially of an aluminum alloy or a magnesium alloy.

2. The clamping tool according to claim 1, wherein said aluminum alloy is AA7075.

3. The clamping tool according to claim 1, wherein said composite material is prepared by dispersing said reinforcing material into said matrix metal with a space loading ratio of between 5 and 50%.

4. The clamping tool according to claim 1, wherein said clamping head is formed of a composite material prepared by dispersing at least one kind of a reinforcing material selected from the group consisting of ceramic short fibers and ceramic whiskers into the matrix metal such that the selected reinforcing material is oriented along a bent portion of the matrix metal.

5. The clamping tool according to claim 4, wherein said composite material is prepared by dispersing said reinforcing material with a space loading ratio of 5 to 50% into said matrix metal.

6. The clamping tool according to claim 1, wherein said clamping head is formed of a composite material prepared by selectively dispersing said reinforcing material into an inner peripheral region along a bent portion of said matrix metal.

7. The clamping tool according to claim 6, wherein said composite material is prepared by selectively dispersing said reinforcing material with a space loading ratio of 10 to 50% into the inner peripheral region along the bent portion of said matrix metal.

8. The clamping tool according to claim 1, wherein said clamping head is formed of a composite material prepared by dispersing said reinforcing material into said matrix metal such that the space loading ratio of the reinforcing material is highest in an innermost region along a bent portion of said matrix metal and is gradually lowered from the innermost region along the bent portion toward an outermost region.

9. The clamping tool according to claim 1, wherein at least said clamping head and said cylinder member, selected from the group consisting of the clamping head, the cylinder member and said ram member included in the clamping tool, are formed of said composite material prepared by dispersing at least one reinforcing material selected from the group consisting of ceramic fibers, ceramic whiskers and ceramic particles into a matrix metal consisting essentially of an aluminum alloy or a magnesium alloy.

* * * * *

UNITED STATES PATENT AND TRADEMARK OFFICE
CERTIFICATE OF CORRECTION

PATENT NO. : 5,216,813

DATED : June 8, 1993

INVENTOR(S) : KODACHI, Osamu et al.

It is certified that error appears in the above-identified patent and that said Letters Patent is hereby corrected as shown below:

Title page:

Section [73] Assignee,
 after "Tokyo, Japan"

add: --; and Burndy-Japan Ltd., Tokyo, Japan--.

Section [56] References Cited, under "U.S. PATENT DOCUMENTS"

"5,062,185" should be --5,063,185--.

Signed and Sealed this

Thirty-first Day of May, 1994

Attest:

BRUCE LEHMAN

*Attesting Officer*     *Commissioner of Patents and Trademarks*